(No Model.)

T. F. CONKLIN.
BLUING PACKAGE.

No. 399,974. Patented Mar. 19, 1889.

Witnesses,
W. Rossiter
Chas Schmid

Inventor,
Theodore F. Conklin
By Price & Fisher
His Attys.

UNITED STATES PATENT OFFICE.

THEODORE F. CONKLIN, OF CHICAGO, ILLINOIS, ASSIGNOR OF ONE-HALF TO NATHAN S. LAPPERR, OF SAME PLACE.

BLUING-PACKAGE.

SPECIFICATION forming part of Letters Patent No. 399,974, dated March 19, 1889.

Application filed September 14, 1888. Serial No. 285,420. (No model.)

*To all whom it may concern:*

Be it known that I, THEODORE F. CONKLIN, a citizen of the United States, residing at Chicago, in the county of Cook and State of Illinois, have invented certain new and useful Improvements in Bluing-Packages, of which I do declare the following to be a full, clear, and exact description, reference being had to the accompanying drawings, forming part of this specification.

In forming packages of bluing designed for laundry purposes it is very desirable that the package shall be so constructed that the bluing can be freely and evenly distributed in the water, and that the dripping from the bluing shall be so retained that it will not be permitted to go to waste or to soil the surface on which the package may be placed when not in use. Appreciating this desideratum, my invention consists, primarily, in a bluing-package composed of multiple layers or thicknesses of suitable material—such, for example, as lamp-wicking, cotton cloth, or other thin material—thickly coated with the bluing and retained within a suitable receptacle having a water-tight portion that will serve to catch the drip from the mass of bluing, and will prevent it being wasted, or soiling any article on which the package may be placed.

Figure 1:
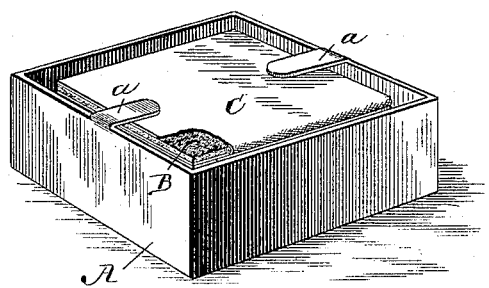
Figure 2:
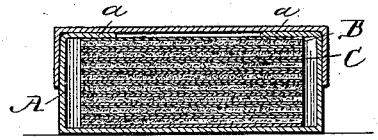
Figure 3:
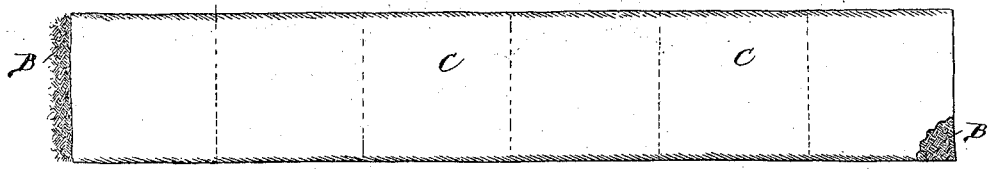

Figure 1 is a perspective view of one form of package embodying my invention. Fig. 2 is a view in central cross-section, the receptacle in this figure being shown as provided with a cover. Fig. 3 is a detail view showing a section of lamp-wicking coated with the bluing.

A designates the body of the receptacle, that may be of any suitable form or shape, the lower portion of this receptacle being water-tight, so as to retain the dripping from the bluing held therein. Within this receptacle A are placed the various layers or thicknesses B of lamp-wicking or other suitable material coated upon each side with the bluing C, the various layers B being shown as placed one upon the other, although it is obvious that these layers may be disposed in any other suitable manner. The package A is by preference provided with lugs or projections *a*, adapted to be folded over and pressed down upon the layers or thicknesses of coated material, in order to properly retain them in position within the receptacle. The preferred manner of forming the coated layers or thicknesses of material is to dip long strips of lamp-wicking or other suitable substance in a mass of thick liquid bluing until the wicking is thickly coated with the bluing, and then cut the wicking into suitable lengths and place these lengths one above the other within the receptacle, as shown. This thick mass of bluing, wherein the strips of lamp-wicking will be dipped, is made by mixing suitable proportions of indigo, glucose, or gum-arabic and water until a viscous yet liquid mass is obtained, the glucose or gum-arabic serving as the vehicle whereby the indigo is caused to better adhere to the surface of the wicking, the strips after being dipped in this mass being allowed to dry somewhat before being placed in the receptacle. It will be readily understood, however, that any suitable material may be employed instead of the lamp-wicking, and that instead of cutting this material the layers may be formed by folding or winding the material into proper shape. The layers of wicking, however, are preferably cut or otherwise formed in such manner that when placed within the receptacle they shall leave a free space around the sides thereof for the ready access of water, and in which space also the dripping from the bluing can be retained, so as to prevent its being wasted and also prevent soiling the surface on which the package may be placed after use. By thus holding the bluing upon layers of suitable material placed one against the other, and held within a suitable receptacle, it is obvious that the water is allowed to contact not only with the surface of the upper layer, but also with the edges of the layers of bluing, and as these edges become more or less worn away by use the water will enter the spaces thus formed between the layers, and a large surface for the access of water will be secured. So, also, it is plain that when the package has been withdrawn from the water the receptacle will serve to catch and retain the dripping from the bluing.

If desired, the receptacle A may be provided with a suitable cover to protect the bluing from dust when not in use.

I am well aware that prior to my invention it has been proposed to form a package for bluing consisting of a water-tight receptacle having inclosed therein a bag containing powdered bluing, and I am also aware that prior to my present invention it has been proposed to put up powdered bluing within a bottle or case having a bag of textile material tied around the mouth thereof, the bag serving to distribute into the water to be colored a limited quantity of the bluing when the bag was immersed therein. I do not, therefore, wish my invention to be understood as covering either of these prior constructions, since both of such prior devices relate to a means for putting up powdered bluing, and both in construction and mode of operation differ radically from my invention.

Having thus described my invention, what I claim as new, and desire to secure by Letters Patent, is—

1. A package of laundry-bluing consisting of multiple thicknesses of suitable material coated with thick bluing, the bluing being arranged in layers between the thicknesses of material whereon it is applied, the various thicknesses of material and layers of thick bluing being held together and fastened within a receptacle having a water-tight portion to catch the drip, substantially as described.

2. A package of laundry-bluing consisting of multiple layers or thicknesses of suitable material coated with thick bluing, the said bluing being arranged in multiple layers between the material whereon it is applied and permanently held within a suitable water-tight portion to catch the drip, said receptacle being of considerably larger size than the layers or thicknesses of coated material in order to permit the access of water around the edges or surface of the coated layers, substantially as described.

3. A package of laundry-bluing consisting of multiple layers or thicknesses of lamp-wicking or like pervious material coated with thick bluing, the said bluing being arranged in multiple layers between the material whereon it is applied and permanently held within a receptacle having a water-tight portion to catch the drip, substantially as described.

THEODORE F. CONKLIN.

Witnesses:
GEO. P. FISHER, Jr.,
NATHAN S. LEPPERR.